US012770064B2

(12) United States Patent
Russenes

(10) Patent No.: US 12,770,064 B2
(45) Date of Patent: Oct. 20, 2026

(54) METHODS AND SYSTEMS FOR OPERATIONAL SURVEILLANCE OF A PHYSICAL ASSET USING SMART EVENT DETECTION

(71) Applicant: Schlumberger Technology Corporation, Sugar Land, TX (US)

(72) Inventor: Carsten Falck Russenes, Sandsli (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 559 days.

(21) Appl. No.: 18/549,930

(22) PCT Filed: Mar. 8, 2022

(86) PCT No.: PCT/US2022/071016
§ 371 (c)(1),
(2) Date: Sep. 11, 2023

(87) PCT Pub. No.: WO2022/192861
PCT Pub. Date: Sep. 15, 2022

(65) Prior Publication Data

US 2024/0152821 A1 May 9, 2024

Related U.S. Application Data

(60) Provisional application No. 63/158,930, filed on Mar. 10, 2021.

(51) Int. Cl.
*G06N 20/00* (2019.01)

(52) U.S. Cl.
CPC .................................... *G06N 20/00* (2019.01)

(58) Field of Classification Search
CPC .............................. G06N 20/00; G05B 23/024
See application file for complete search history.

(56) References Cited

U.S. PATENT DOCUMENTS

2018/0096243 A1 4/2018 Patil et al.
2018/0281256 A1 10/2018 Asaoka et al.
2019/0235484 A1 8/2019 Ristovski
(Continued)

OTHER PUBLICATIONS

Search Report and Written Opinion of International Patent Application No. PCT/US2022/071016 dated on Jun. 17, 2022, 09 pages.

*Primary Examiner* — Michael H Hoang
(74) *Attorney, Agent, or Firm* — Kyle R. Miiller

(57) ABSTRACT

Methods and systems are provided for monitoring a physical asset, which includes receiving or collecting time-series data related to operation or status of the physical asset; identifying a time period when the physical asset is experiencing a change in operational state; extracting time-series data corresponding to the time period as event data; generating label data that classifies or characterizes the event data as pertaining to a particular type of event; saving the event data and the corresponding label data in a data repository; and using the event data and label data stored in the data repository to train or update a machine learning system to detect the occurrence of events that are similar to the event types of the labeled event data stored in the data repository from time-series data generated by the physical asset or by another physical asset that operates in a similar manner to the physical asset.

20 Claims, 7 Drawing Sheets

(56) References Cited

U.S. PATENT DOCUMENTS

| | | | |
|---|---|---|---|
| 2019/0291271 A1 | 9/2019 | Hayashi | |
| 2020/0134510 A1 | 4/2020 | Basel et al. | |
| 2020/0285997 A1 | 9/2020 | Bhattacharyya | |
| 2020/0379454 A1 | 12/2020 | Trinh | |
| 2021/0027205 A1* | 1/2021 | Sevakula | G06F 11/008 |
| 2021/0048809 A1* | 2/2021 | Zhang | G05B 23/0254 |
| 2022/0004174 A1* | 1/2022 | Kaira | G06F 18/23 |

* cited by examiner

METHODS AND SYSTEMS FOR OPERATIONAL SURVEILLANCE OF A PHYSICAL ASSET USING SMART EVENT DETECTION

CROSS-REFERENCE TO RELATED APPLICATION(S)

The present disclosure is a National Stage Entry of International Application No. PCT/US2022/071016, filed Mar. 8, 2022, which claims priority from U.S. Provisional Appl. No. 63/158,930, filed on Mar. 10, 2021, herein incorporated by reference in its entirety.

FIELD

The present disclosure relates to methods and systems that provide for operational surveillance of physical assets, such as industrial equipment, devices, systems, and processes.

BACKGROUND

Current methods and systems that perform operational surveillance of physical assets (such as industrial equipment, devices, systems, and processes) face several challenges, including the following: i) configuring and maintaining rule-based alerts or alarms on sensor data (i.e., threshold high-temperature alarm); and ii) for more advanced analytics, the population of a relevant data set for model training is time-consuming.

The configuration of a rule-based alert or alarm is typically based on logic that involves one or more thresholds of operational data, such as high or low limits of time-series data measured by one or more sensors. The intention is that when the time-series data is above/below a specific value, the data reflects a symptom of an operational state change with regard to an associated physical asset (such as failure or changing operating conditions of the associated physical asset). In this manner, the operational state change of the physical asset can be detected by identifying that the corresponding threshold in the time-series data has been crossed. Whenever the threshold is crossed (and thus the operational state change of the physical asset has been detected), an alert or alarm can be raised, and the alert or alarm can be communicated to one or more users in order to inform such user(s) of the corresponding operational state change. Some of the challenges with such systems are alarm management, as it can populate a significant number of alerts from a varying and noisy input signal, and the threshold limit might have to be changed multiple times over the lifetime of a physical asset.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, a method for monitoring operation or status of a physical asset is described. The method includes: i) receiving or collecting time-series data related to operation or status of the physical asset; ii) identifying a time period when the physical asset is experiencing a change of operational state; iii) extracting time-series data corresponding to the time period of ii) as event data; iv) generating label data that classifies or characterizes the event data of iii) as pertaining to a particular type of event; v) saving the event data of iii) and the corresponding label data of iv) in a data repository; and vi) using the event data and label data stored in the data repository in v) to train or update a machine learning system to detect the occurrence of events that are similar to the event types of the labeled event data stored in the data repository from time-series data generated by the physical asset or by another physical asset that operates in a similar manner to the physical asset.

In another embodiment, a system for monitoring operation or status of a physical asset is described. The system includes at least one processor configured to perform operations that involve i) receiving or collecting time-series data related to operation or status of the physical asset; ii) identifying a time period when the physical asset is experiencing a change of operational state; iii) extracting time-series data corresponding to the time period of ii) as event data; iv) generating label data that classifies or characterizes the event data of iii) as pertaining to a particular type of event; v) saving the event data of iii) and the corresponding label data of iv) in a data repository; and vi) using the event data and label data stored in the data repository in v) to train or update a machine learning system to detect the occurrence of events that are similar to the event types of the labeled event data stored in the data repository from time-series data generated by the physical asset or by another physical asset that operates in a similar manner to the physical asset.

Further features and advantages of the subject disclosure will become more readily apparent from the following detailed description when taken in conjunction with the accompanying drawings.

BRIEF DESCRIPTION OF THE DRAWINGS

The subject disclosure is further described in the detailed description which follows, in reference to the noted plurality of drawings by way of non-limiting examples of embodiments of the subject disclosure, in which like reference numerals represent similar parts throughout the several views of the drawings, and wherein.

DETAILED DESCRIPTION

Figure 1:
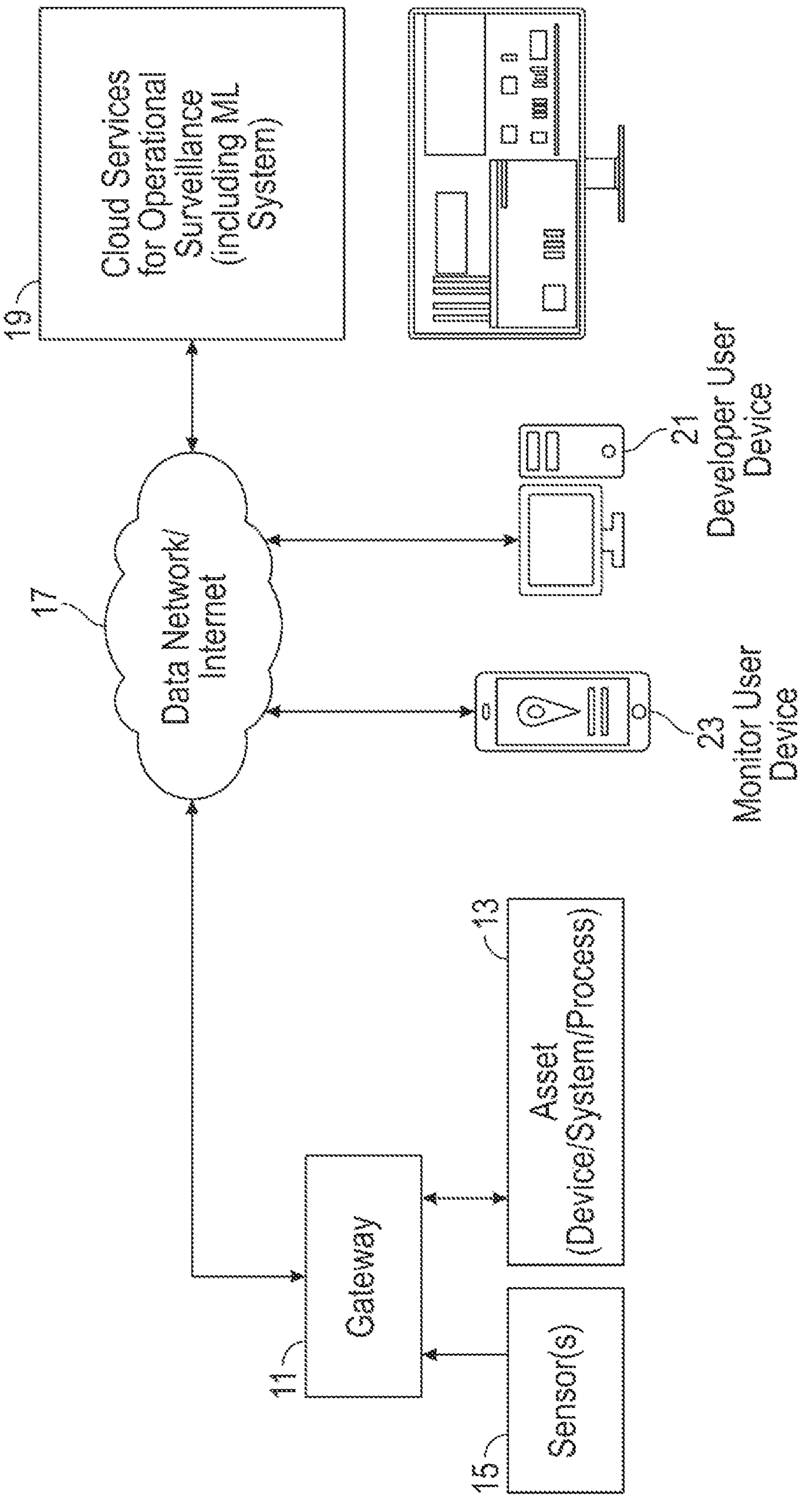
FIG. 1 is a schematic diagram of an example system that monitors operation or status of a physical asset (such as industrial equipment, devices, systems, and processes) according to an embodiment of the present disclosure.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc., may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms “a,” “an,” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof. Further, as used herein, the term “if” may be construed to mean “when” or “upon” or “in response to determining” or “in response to detecting,” depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Methods and systems are provided for monitoring operation or status of a physical asset, which involve receiving or collecting time-series data related to operation or status of the physical asset. A time period when the physical asset is experiencing a change of operational state is identified, preferably by user interaction with a graphical user interface that displays the received or collected time-series data. Time-series data corresponding to the identified time period is extracted as event data. Label data that classifies or characterizes the event data as pertaining to a particular type of event is generated, preferably by user interaction with a graphical user interface that displays the received or collected time-series data or associated event data. The event data and corresponding label data can be stored in a data repository and used to train or update a machine learning system to detect the occurrence of events that are similar to the event types of the labeled event data stored in the data repository from time-series data generated by the physical asset or by another physical asset that operates in a similar manner to the physical asset. The machine learning system can be trained to perform pattern recognition on future time-series data to detect or find similar events in the future time-series data, and/or the machine learning system can be used to perform pattern recognition in past time-series data to detect or find similar events in the past time-series data. The event data corresponding to a similar event in the future or past time-series data can be used to further train the machine learning system to incrementally improve its capabilities and continuously identify when new similar events occur.

The present disclosure provides methods and systems of operational surveillance of physical assets (such as industrial equipment, devices, systems, and processes) that address the challenges and limitations of the prior art methods and systems. Specifically, threshold alerts and alarm(s) for one or more sensor measurements can be avoided. Instead, a user (who is referred to as a “developer user” herein and can be one or more data scientists or other users responsible for developing and/or maintaining the methodology and system) can select a time period when the physical asset is experiencing a particular change of operational state (i.e., start-up, shut-in, high/low vibration, flow change, etc.). Time-series data (e.g., real-time operational data) that characterizes operation of the physical asset during the selected time period (where such time-series data is referred to as event data herein) can be collected or extracted, and label data that classifies or characterizes the event data as pertaining to a particular type of event can be generated. The event data along with the corresponding label data can be stored in a database or other data repository, and then used to train or update a machine learning system to detect the occurrence of events that are similar to the event types of the labeled event data stored in the data repository from time-series data generated by the same physical asset (or by another physical asset that operates in a similar manner to the physical asset). In embodiments, the machine learning system can be trained to perform pattern recognition (e.g., univariate pattern recognition) on future time-series data to detect or find similar events in the future time-series data. The trained machine learning system can also be used to perform pattern recognition on past time-series data to detect or find similar events in the past time-series data. The event data corresponding to a similar event in the future or past time-series data can be used to further train the machine learning system to incrementally improve its capabilities and continuously identify when new similar events occur.

The developer user can specify features or characteristics of the event data that is stored into the data repository for which the developer user would like to be notified. For example, such features can represent duration of the underlying event, frequency of the underlying event, first occurrence of the underlying event, etc. Such features or characteristics can be used to process and filter the event data stored in the data repository over time to extract the corresponding event data and then provide notification of the availability of such event data. The developer user can use the available event data to train the machine learning system to incrementally improve its capabilities and continuously identify when new similar events occur. In this manner, a cognitive surveillance system is provided where the developer user can train the machine learning system to fit particular needs based on what changes are important to be notified on.

Furthermore, the methods and systems can be adapted such that multiple developer users can contribute event data and label data to the data repository. This can facilitate crowdsourcing of labeled events in a common repository, accessible as pre-processed training data set for the developer users to develop more advanced machine learning models for operational surveillance.

In embodiments, the methods and systems described herein can employ a distributed computing platform for operational surveillance of a physical asset, as shown in FIG. 1. The physical asset 13 can be industrial equipment, devices, systems, and processes. The distributed computing platform includes a gateway device 11 that is located at or near physical asset 13. The gateway device 11 interfaces to one or more sensors 15 that performs measurements that characterize the operation of the physical asset 13. Sensor data output by such sensor(s) 15 can be collected and/or aggregated and/or otherwise processed by gateway 11 in real-time. The sensor data collected and/or aggregated and/or otherwise processed by the gateway 11 can be communicated over a data network 17 to cloud services 19, which employ a cloud computing environment that receives such data and processes such data to monitor operating conditions and status of the physical asset 13. The data communication network 17 can be a cellular data network, satellite link, the Internet, or other mode of data communication. For example, in one illustrative embodiment, the physical asset 13 can be equipment located at a wellsite that is used to produce hydrocarbons (e.g., petroleum fluids) from subsurface earth formations. In this case, gateway 11 interfaces to one or more sensors that perform measurements that characterize the operation of the wellsite equipment.

The cloud services 19 include services that monitor operating conditions and status of the physical asset 13, which is referred to as operational surveillance of the physical asset 13. Such services are typically embodied by software executing in a computing environment, such as a cloud computing environment. In embodiments, the cloud computing environment can be configured to deliver different resources through data communication over the Internet. Such resources can include tools and computing services, such as data storage, servers, databases, networking, and software. Examples of commercially available cloud computing environments include the Azure cloud services offered by Microsoft of Redmond, Washington, the AWS cloud services offered by Amazon Web Services, Inc. of Seattle, Washington, and the Google Cloud Services offered by Google of Mountain View, California. An example computing environment is described below with respect to FIG. 7. The services employ a machine learning system that is trained using the methods and systems as described herein to detect events in time-series data (e.g., real-time operational data) that characterizes operation of the physical asset 13 as supplied to the cloud services 19 by the gateway 11. One or more developer users can interface to the cloud services 19 employing device(s) 21 that communicate with the services 19 over the data network 17. The device(s) 21 can be a personal computer, a portable computer such as a laptop or tablet, a smartphone, or other suitable communication or computing device as described below with respect to FIG. 7. Through the operation of the developer user device(s) 21 in communication with the cloud services 19, the developer users can assist in the configuration and training of the machine learning system using the methods and systems as described herein. In response to the events detected by the machine learning system and/or to alerts or alarms corresponding to such events, the physical asset 13 can possibly be controlled remotely by commands issued by the cloud services 19 or by another system and/or from commands issued by autonomous control operations performed by the gateway 11. Furthermore, the cloud services 19 can be configured to notify one or more users (who are referred to as "monitor users" herein and can be one or more engineers or other users responsible for monitoring and managing the operation of the physical asset 13) of the events detected by the machine learning system or corresponding alerts or alarm. For example, the monitor users can be notified by messaging (e.g., email messaging or in-app messaging) and/or by presentation and display of an alert or alarm or other visual or multimedia representation corresponding to a detected event. To support notification of monitor users, the monitor users can interface to the cloud services 19 employing device(s) 23 that communicate with the cloud services 19 over the data network 17. The monitor user device(s) 23 can be a personal computer, a portable computer such as a laptop or tablet, a smartphone, or other suitable communication or computing device as described below with respect to FIG. 7.

Figure 2:
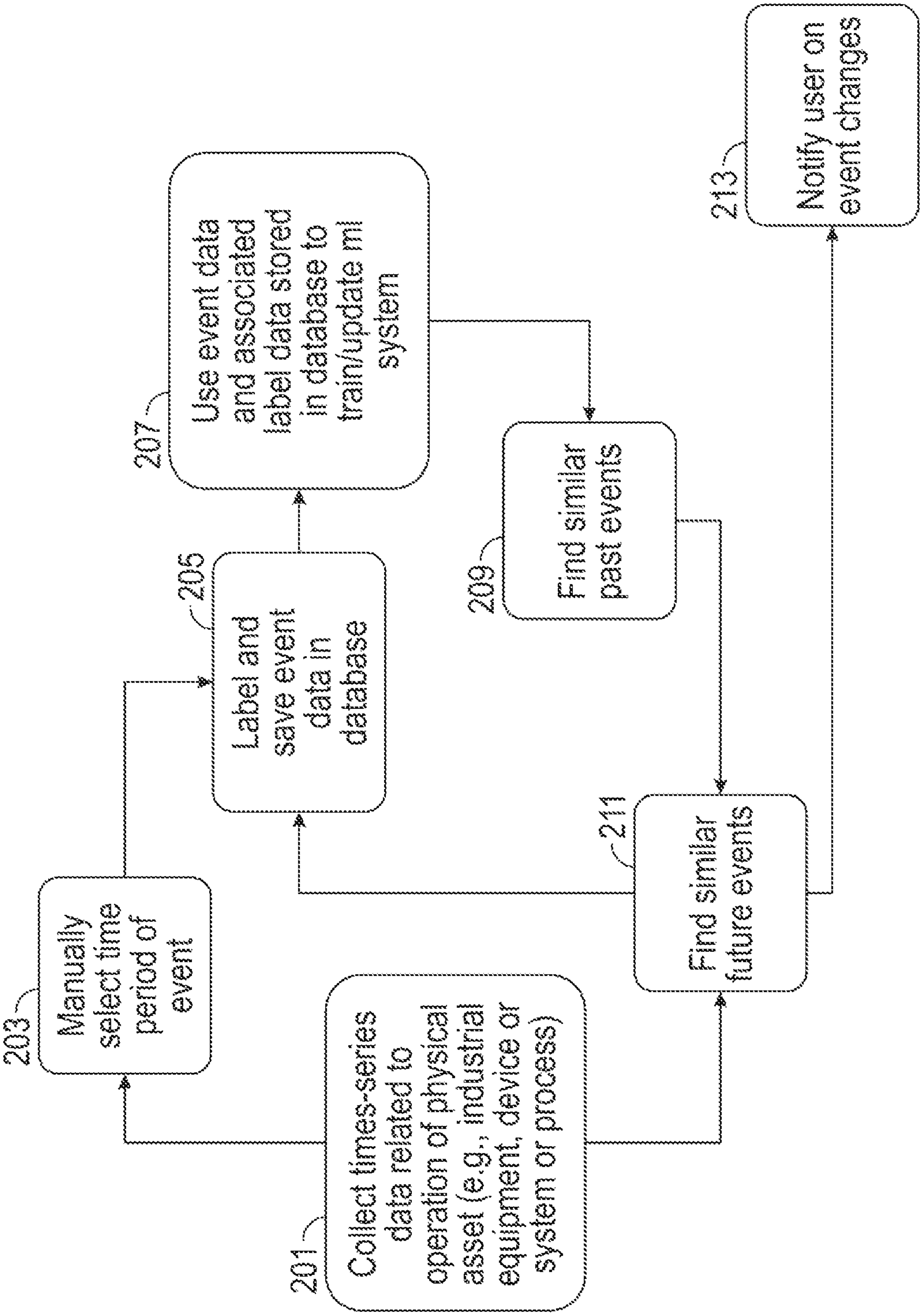
FIG. 2 illustrates a workflow for training a machine learning system embodied by the cloud services of FIG. 1 according to an embodiment of the present disclosure, where the machine learning system is configured to detect events in time-series data that characterize operation or status of a physical asset.

FIG. 2 is a schematic diagram of a workflow for training the machine learning system embodied by the cloud services of FIG. 1.

In block 201, time-series data (e.g., real-time operational data) derived from sensor measurements and related to operation or status of a physical asset (e.g., industrial equipment, device, system, or process) is received or collected. In embodiments, such time-series data (e.g., real-time operational data) can be communicated from a gateway device associated with the physical asset, such as the gateway device 11 associated with physical asset 13 of FIG. 1.

In block 203, a user (e.g., developer user) can select a time period when the physical asset is experiencing a particular change of operational state (i.e., start-up, shut-in, high/low vibration, flow change, etc.). The event can relate to any behavior of the physical asset that the user wants to track or be notified of. In embodiments, the event can be described by a particular label or event type that belongs to one or two event categories; cyclic events and anomaly events. For example, labels or event types for cyclic events can represent valve actuation, pump trip, shut-in periods, shut-downs, pump on-off, tank refilling, etc. Anomaly events are events that are not supposed to happen. For example, labels or event types for anomaly events can represent leaks, overpressure, failure, etc.

In block 205, the time-series data corresponding to the selected time period/event is extracted from the time-series data as event data, and the user generates label data that classifies or characterizes the event data as pertaining to a particular type of event. The event data along with the corresponding label data is stored in a database or other data repository.

In block 207, the event data and corresponding label data stored in the data repository can be used to train or update a machine learning system to detect the occurrence of events that are similar to the event types of the labeled event data stored in the data repository from time-series data generated by the same physical asset (or by another physical asset that operates in a similar manner to the physical asset).

In block 209, the trained machine learning system can be used to perform pattern recognition (e.g., univariate pattern recognition) on past time-series data to detect or find similar events in the past time-series data. In block 211, the trained machine learning system can be used to perform pattern recognition (e.g., univariate pattern recognition) on future time-series data to detect or find similar events in the future time-series data. The event data corresponding to a similar event in the future or past time-series data can be used to further train the machine learning system to incrementally improve its capabilities and continuously identify when new similar events occur. In embodiments, the machine learning system can employ a computation model that uses machine learning and/or pattern recognition to identify a pattern of one event type (with one or more instances in the set) in univariate time-series data supplied as input to the computational model. In embodiments, the machine learning system can be configured to learn and adapt without following explicit instructions, by using algorithms and statistical models to analyze and draw inferences from patterns in the time-series data supplied as input to the system. In embodiments, the machine learning system can employ one or more computational models, such as an artificial neural network, a decision tree model, a support-vector machine, regression analysis, and a Bayesian network.

Users (e.g., one or more developer users) can specify features or characteristics of the event data that is stored into the data repository for which they would like to be notified. For example, such features can represent duration of the underlying event, frequency of the underlying event, first occurrence of the underlying event, etc. In embodiments, such features or characteristics can be used to process and filter the event data stored in the data repository to extract the corresponding event data. In block 213, the user can be notified of the availability of the corresponding event data. The user can use the available event data to train the machine learning system to incrementally improve its capabilities and continuously identify when new similar events occur. In this manner, a cognitive surveillance system is provided where a user can train the machine learning system to fit the user's particular need based on what changes are important to be notified on.

Furthermore, the workflow of FIG. 2 can be adapted such that multiple users (e.g., multiple developer users) can contribute event data and label data to the data repository. This can facilitate crowdsourcing of labeled events in a common repository, accessible as pre-processed training data set for data scientists to develop more advanced machine learning systems and models for operational surveillance.

Figure 3:
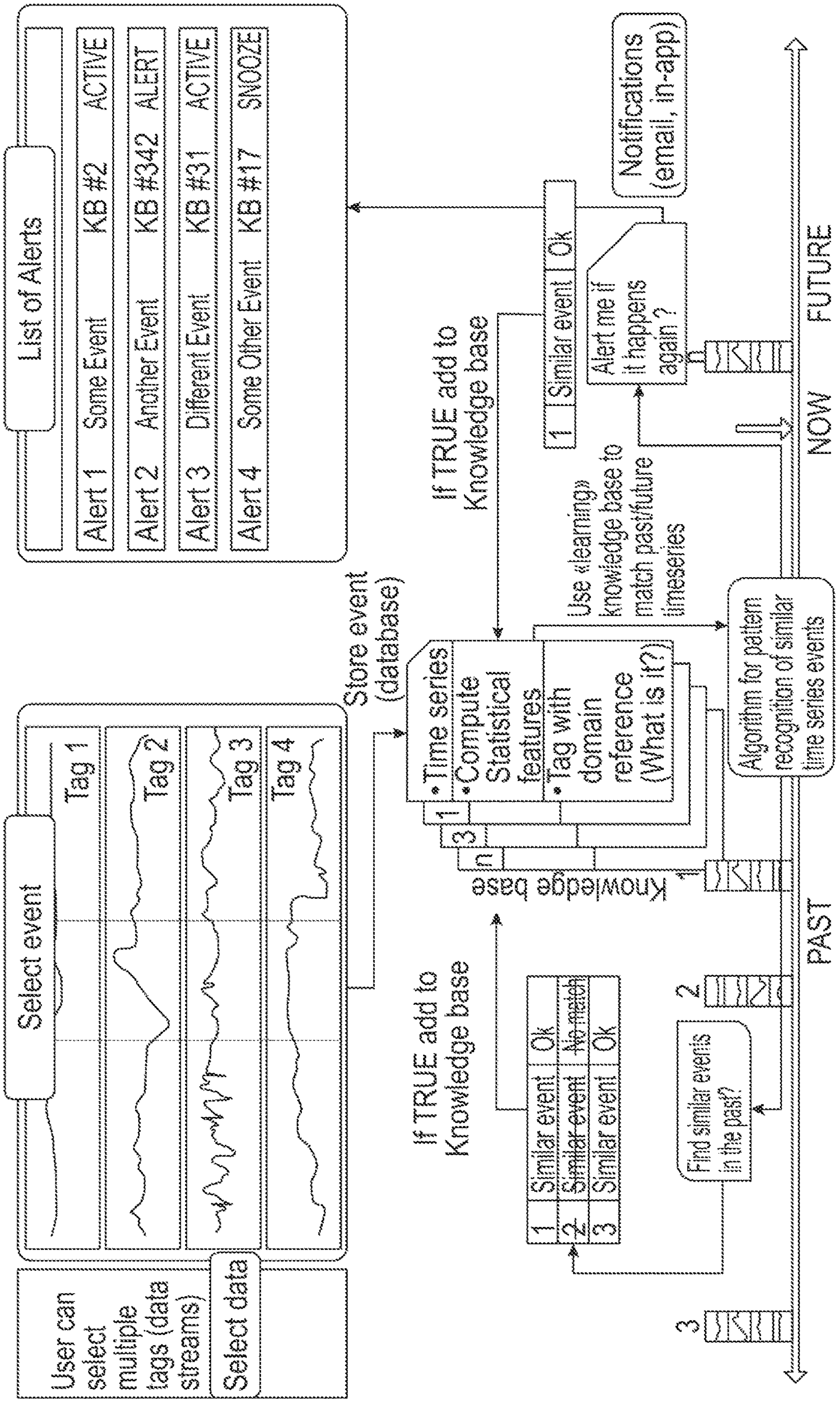
FIG. 3 illustrates another example workflow for training a machine learning system embodied by the cloud services of FIG. 1 according to an embodiment of the present disclosure, along with graphical user interfaces that can be accessed by users to assist in identifying and labeling events in time-series data that characterizes operation or status of a physical asset.

In embodiments, the methods and systems described herein can be configured to enable a user (e.g., developer user) to identify or select an event within time-series data utilizing a graphical user interface based on a set of tags (e.g., data streams). An example of such a graphical user interface is illustrated in FIG. 3. Once an event has been identified within one or more tags or data streams, the user can interact with the graphical user interface to select or specify a label for the event and save event data (i.e., the time-series data corresponding to the selected event) and corresponding label data (i.e., data presenting the label associated with event data) to the data repository. The machine learning system can be configured and trained to identify if similar events have occurred in the past or are occurring in the future. For each new similar event found, the machine learning system can be retrained to improve its capability of detecting similar events. In embodiments, the user can subscribe for notification of new events stored in the data repository based on predefined characteristics associated with such new events, such as total number, the sum of duration, frequency, individual duration of the event, or if a new event is detected as shown in FIG. 3. The notifications can be provided by messaging (such as email messaging) or in-app notifications. By this approach, the methods and systems can improve the capabilities and efficiency of the operational surveillance of the physical assets.

Figure 4:
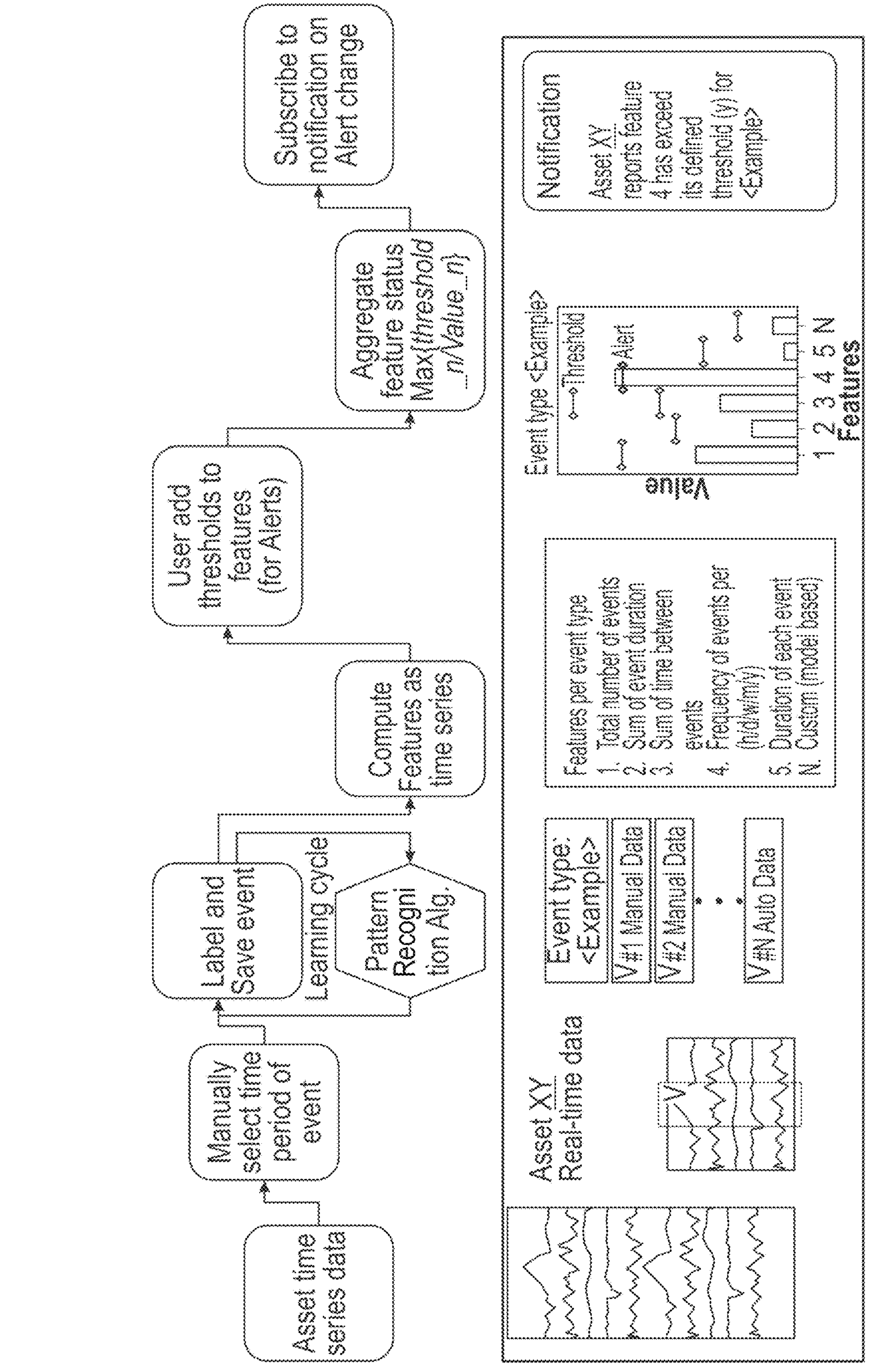
FIG. 4 illustrates yet another example workflow for training a machine learning system embodied by the cloud services of FIG. 1 according to an embodiment of the present disclosure, where the machine learning system is configured to detect events in time-series data that characterize operation or status of a physical asset.

FIG. 4 is a schematic diagram illustrating a workflow similar to the workflow of FIG. 3.

Figure 5:
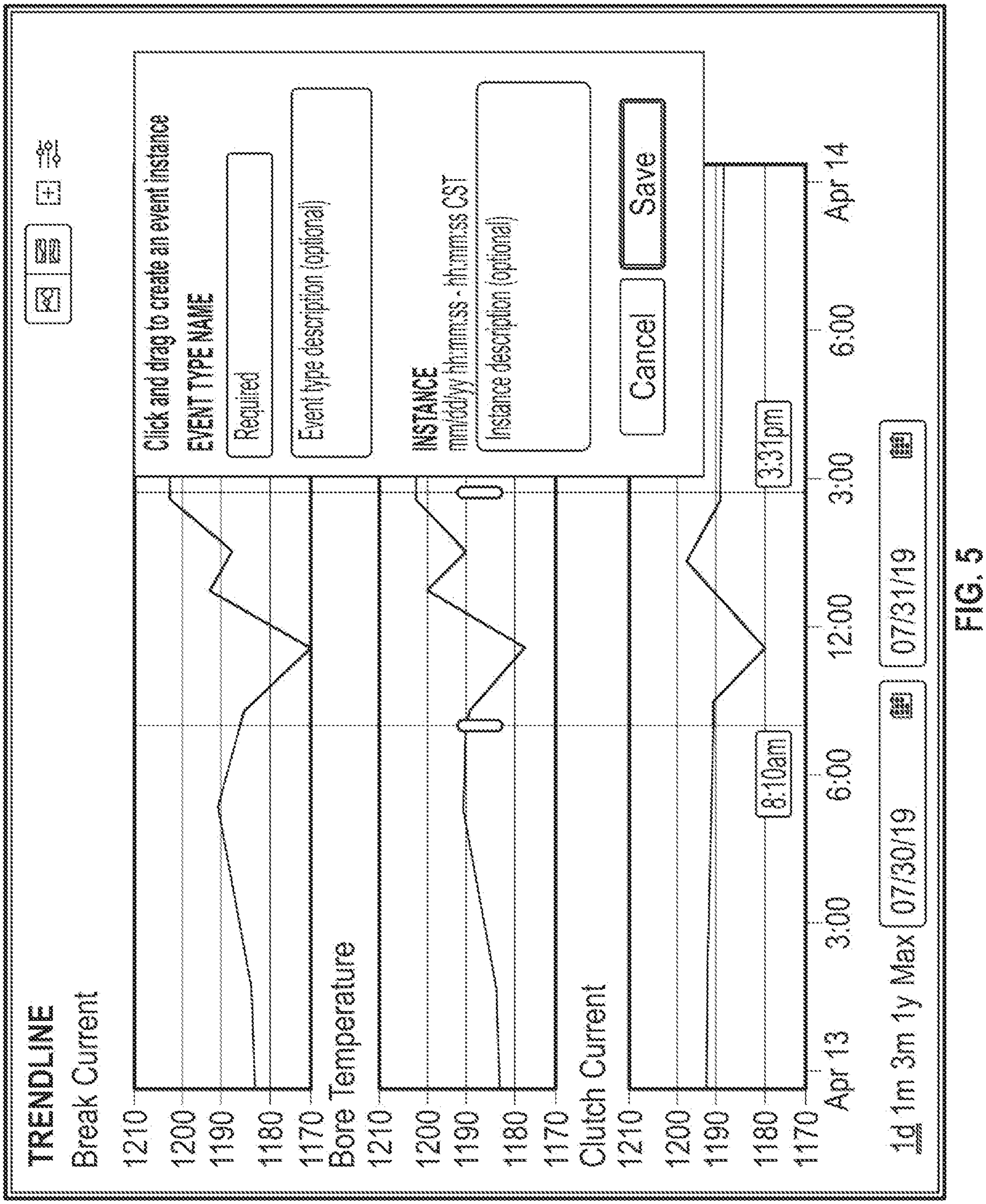
FIG. 5 illustrates an example graphical user interface that can be accessed by users to assist in labeling events in time-series data that characterizes operation or status of a physical asset.

FIG. 5 illustrates another graphical user interface that is configured to enable a user (e.g., developer user) to identify or select an event within time-series data. Once an event has been identified, the user can interact with a graphical user interface to select or specify a label (or name) for the event and save the event data (i.e., the time-series data corresponding to the selected event) and corresponding label data (i.e., data presenting the label associated with event data) to a data repository for training the machine learning system.

Figure 6:
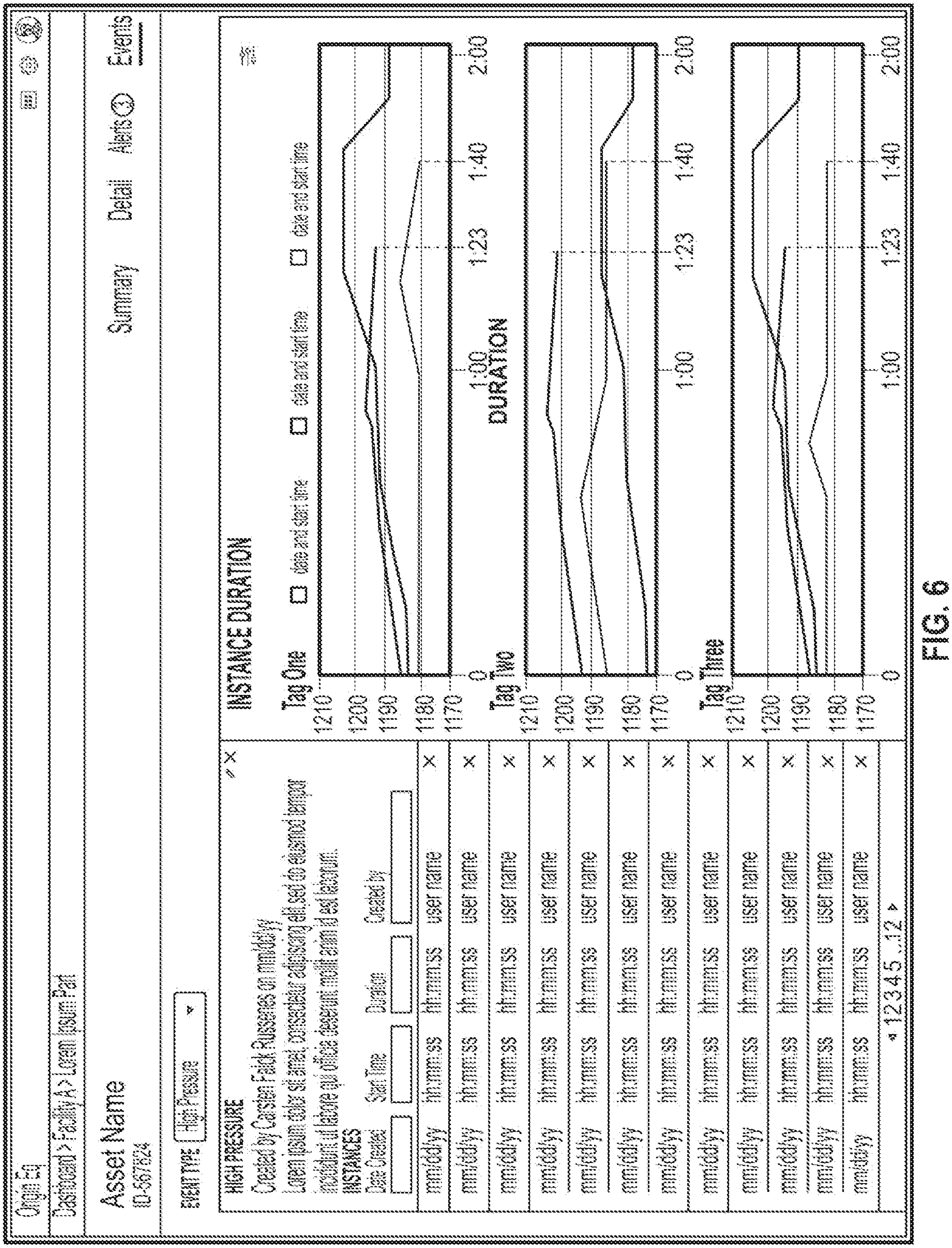
FIG. 6 illustrates a graphical user interface that can be presented to a user to display event data (i.e., time-series data corresponding to a number of user-selected events) and corresponding label data (i.e., data presenting the label associated with event data). The event data and corresponding label data can be stored in a data repository and used to train a machine learning system for detecting similar events (i.e., the machine learning system embodied by the cloud services of FIG. 1)

FIG. 6 illustrates a graphical user interface that can be presented to a user (e.g., developer user) to display event data (i.e., time-series data corresponding to a number of user-selected events) and corresponding label data (i.e., data presenting the label associated with event data) stored in the data repository. The event data and corresponding label data stored in the data repository can be used to train the machine learning system for detecting similar events as described herein.

Figure 7:
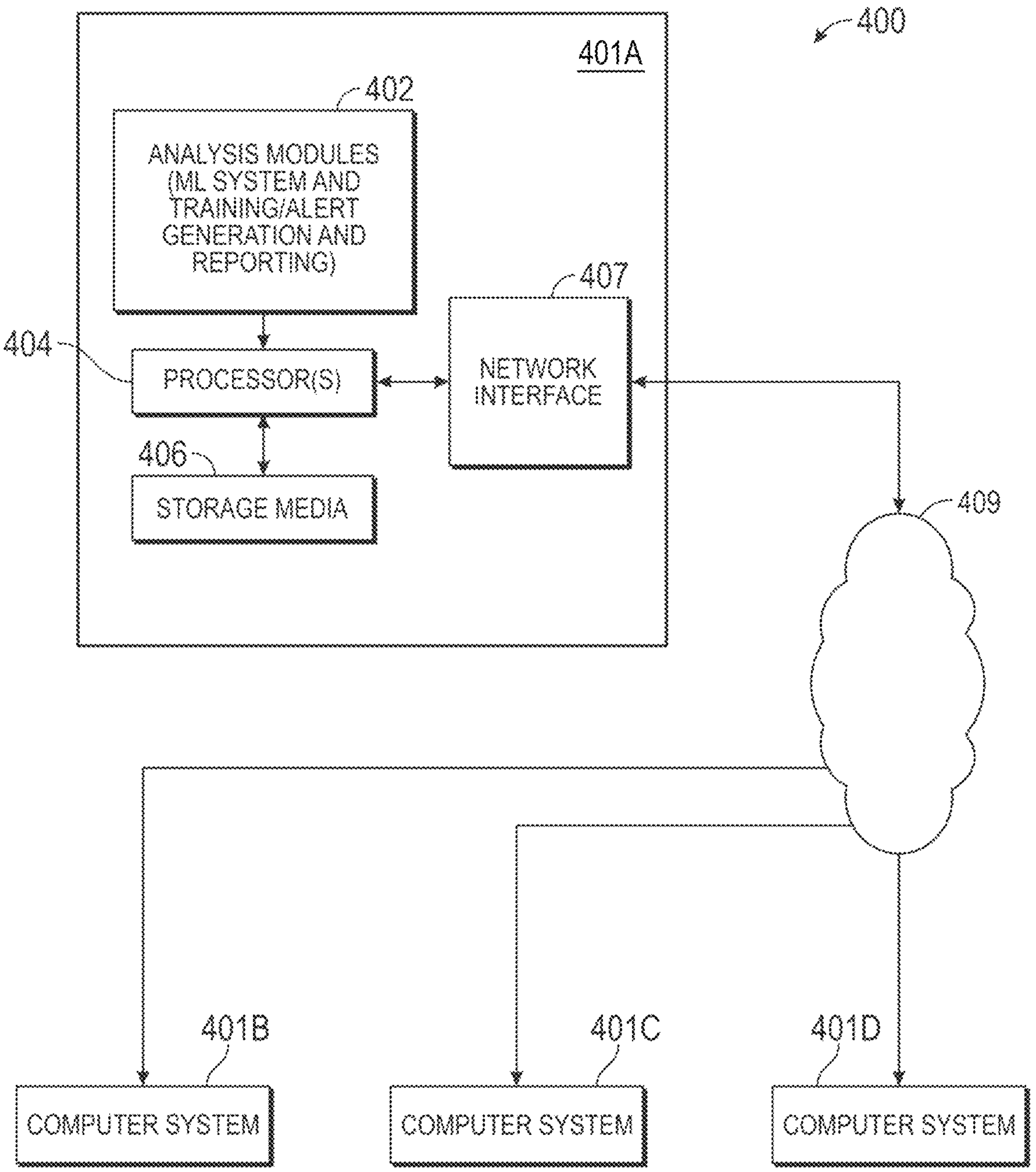
FIG. 7 illustrates a schematic view of a computing system according to an embodiment of the present disclosure.

In some embodiments, the methods of the present disclosure may be executed by a computing system. FIG. 7 illustrates an example of such a computing system 400, in accordance with some embodiments. The computing system 400 may include a computer or computer system 401A, which may be an individual computer system 401A or an arrangement of distributed computer systems. The computer system 401A includes one or more analysis modules 402 that are configured to perform various tasks according to some embodiments, such as one or more methods disclosed herein. To perform these various tasks, the analysis module(s) 402 executes independently, or in coordination with, one or more processors 404, which is (or are) connected to one or more storage media 406. The processor(s) 404 is (or are) also connected to a network interface 407 to allow the computer system 401A to communicate over a data network 409 with one or more additional computer systems and/or computing systems, such as 401B, 401C, and/or 401D (note that computer systems 401B, 401C and/or 401D may or may not share the same architecture as computer system 401A, and may be located in different physical locations, e.g., computer systems 401A and 401B may be located in a processing facility, while in communication with one or more computer systems such as 401C and/or 401D that are located in one or more data centers, and/or located in varying countries on different continents).

A processor may include a microprocessor, microcontroller, processor module or subsystem, programmable integrated circuit, programmable gate array, or another control or computing device.

The storage media 406 may be implemented as one or more computer-readable or machine-readable storage media. Note that while in the example embodiment of FIG. 7, storage media 406 is depicted as within computer system 401A, in some embodiments, storage media 406 may be distributed within and/or across multiple internal and/or external enclosures of computing system 401A and/or additional computing systems. Storage media 406 may include one or more different forms of memory, including semiconductor memory devices such as dynamic or static random access memories (DRAMs or SRAMs), erasable and programmable read-only memories (EPROMs), electrically erasable and programmable read-only memories (EEPROMs), and flash memories, magnetic disks such as fixed, floppy and removable disks, other magnetic media including tape, optical media such as compact disks (CDs) or digital video disks (DVDs), other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

It should be appreciated that computing system 400 is only one example of a computing system, and that computing system 400 may have more or fewer components than shown, may combine additional components not depicted in the example embodiment of FIG. 7, and/or computing system 400 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods and workflows described herein may be implemented by running one or more functional modules in information processing apparatus such as general-purpose processors or application specific chips, such as ASICs, FPGAs, PLDs, or other appropriate devices. These modules, combinations of these modules, and/or their combination with general hardware are all included within the scope of protection of the invention.

It is important to recognize that machine learning system that performs the operational surveillance of a physical asset may be refined in an iterative fashion; this concept is applicable to the methods discussed herein. This may include use of feedback loops executed on an algorithmic basis, such as at a computing device (e.g., computing system 400, FIG. 7), and/or through manual control by a user.

For explanation, the foregoing description has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

There have been described and illustrated herein several embodiments of methods and systems for monitoring operation or status of a physical asset. While particular scenarios have been disclosed, it will be appreciated that other scenarios could be used as well. It will therefore be appreciated by those skilled in the art that yet other modifications could be made to the provided invention without deviating from its spirit and scope as claimed.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for monitoring operation or status of a physical asset at a wellsite, comprising:

i) receiving or collecting time-series data related to operation or status of the physical asset;

ii) identifying a time period when the physical asset is experiencing a change in operational state, wherein the time period is identified by a first user with a first graphical user interface that displays the time-series data of i);

iii) extracting time-series data corresponding to the time period of ii) as event data;

iv) generating label data that classifies or characterizes the event data of iii) as pertaining to a particular type of event of a plurality of types of events;

v) identifying one or more events of interest based on the plurality of types of events, wherein the one or more events of interest are identified by the first user with the first graphical user interface;

vi) saving the event data of iii) and the corresponding label data of iv) in a data repository;

vii) using the event data and label data stored in the data repository in vi) to train or update a machine learning system to detect the occurrence of events that are similar to the event types of the labeled event data stored in the data repository from time-series data generated by the physical asset or by another physical asset that operates in a similar manner to the physical asset;

viii) issuing a notification to a second user, via a second graphical interface, regarding the one or more events of interest; and ix) issuing a command to control the physical asset based on the one or more events of interest.

2. The method according to claim 1, wherein:

the trained machine learning system is used to perform pattern recognition in future time-series data to detect or find similar events in the future time-series data.

3. The method according to claim 2, wherein:

the event data corresponding to a similar event in the future time-series data is used to further train the machine learning system to incrementally improve its capabilities and continuously identify when new similar events occur.

4. The method according to claim 1, wherein:

the trained machine learning system is used to perform pattern recognition in past time-series data to detect or find similar events in the past time-series data.

5. The method according to claim 4, wherein:

the event data corresponding to a similar event in the past time-series data is used to further train the machine learning system to incrementally improve its capabilities and continuously identify when new similar events occur.

6. The method according to claim 1, wherein:

the label data of iv) is generated by the first user in a user interaction with the first graphical user interface that displays the time-series data of i) or associated event data.

7. The method according to claim 1, wherein:

the time-series data of i) is communicated from a gateway device that interfaces to at least one sensor associated with the physical asset.

8. The method according to claim 1, which is performed by at least one processor embodied by a cloud data processing environment.

9. The method according to claim 1, wherein the physical asset comprises wellsite equipment configured to produce hydrocarbons at the wellsite, and wherein the label data comprises valve actuation events, pump trip events, shut-in period events, shut-down events, pump on-off events, tank refilling events, leak events, overpressure events, failure events, or other wellsite events, or any combination thereof.

10. The method according to claim 1, wherein the generating label data comprises categorizing one or more first events as cyclic events and one or more second events as anomaly events.

11. A system for monitoring operation or status of a physical asset at a wellsite, comprising:

at least one processor configured to perform operations that involve;

i) receiving or collecting time-series data related to operation or status of the physical asset;

ii) identifying a time period when the physical asset is experiencing a change in operational state, wherein the time period is identified by a first user with a first graphical user interface that displays the time-series data of i);

iii) extracting time-series data corresponding to the time period of ii) as event data;

iv) generating label data that classifies or characterizes the event data of iii) as pertaining to a particular type of event of a plurality of types of events;

v) identifying one or more events of interest based on the plurality of types of events, wherein the one or more events of interest are identified by the first user with the first graphical user interface;

vi) saving the event data of iii) and the corresponding label data of iv) in a data repository;

vii) using the event data and label data stored in the data repository in vi) to train or update a machine learning system to detect the occurrence of events that are similar to the event types of the labeled event data stored in the data repository from time-series data generated by the physical asset or by another physical asset that operates in a similar manner to the physical asset;

viii) issuing a notification to a second user, via a second graphical interface, regarding the one or more events of interest; and ix) issuing a command to control the physical asset based on the one or more events of interest.

12. The system according to claim 11, wherein:

the trained machine learning system is used to perform pattern recognition in future time-series data to detect or find similar events in the future time-series data.

13. The system according to claim 12, wherein:

the event data corresponding to a similar event in the future time-series data is used to further train the machine learning system to incrementally improve its capabilities and continuously identify when new similar events occur.

14. The system according to claim 11, wherein:

the trained machine learning system is used to perform pattern recognition in past time-series data to detect or find similar events in the past time-series data.

15. The system according to claim 14, wherein:

the event data corresponding to a similar event in the past time-series data is used to further train the machine learning system to incrementally improve its capabilities and continuously identify when new similar events occur.

16. The system according to claim 11, wherein:

the label data of iv) is generated by the first user in a user interaction with the first graphical user interface that displays the time-series data of i) or associated event data.

17. The system according to claim 11, wherein:

the time-series data of i) is communicated from a gateway device that interfaces to at least one sensor associated with the physical asset.

18. The system according to claim 11, further comprising a memory system storing instructions that, when executed by the at least one processor, configures the at least one processor to perform the operations of i) to vi).

19. The system according to claim 11, wherein the at least one processor is embodied by a cloud data processing environment.

20. A non-transitory, computer-readable medium containing instructions for monitoring operation or status of a physical asset at a wellsite, the instructions causing a processor to execute operations comprising:

i) receiving or collecting time-series data related to operation or status of the physical asset;

ii) identifying a time period when the physical asset is experiencing a change in operational state, wherein the time period is identified by a first user with a first graphical user interface that displays the time-series data of i);

iii) extracting time-series data corresponding to the time period of ii) as event data;

iv) generating label data that classifies or characterizes the event data of iii) as pertaining to a particular type of event of a plurality of types of events;

v) identifying one or more new types of events to generate a new plurality of types of events, wherein the one or more new types of events are identified by the first user with the first graphical user interface;

vi) identifying one or more events of interest based on the plurality of types of events, wherein the one or more events of interest are identified by the first user with the first graphical user interface;

vii) saving the event data of iii) and the corresponding label data of iv) in a data repository;

viii) using the event data and label data stored in the data repository in vii) to train or update a machine learning system to detect the occurrence of events that are similar to the event types of the labeled event data stored in the data repository from time-series data generated by the physical asset or by another physical asset that operates in a similar manner to the physical asset;

ix) issuing a notification to a second user, via a second graphical interface, regarding the one or more events of interest; and x) issuing a command to control the physical asset based on the one or more events of interest.

* * * * *